United States Patent [19]

Sera et al.

[11] 4,096,137
[45] Jun. 20, 1978

[54] GELATIN HARDENING AGENTS

[75] Inventors: Hidefumi Sera; Kameji Nagao, both of Minami Ashigara, Japan

[73] Assignee: Fuji Photo Film Co., Ltd., Minami Ashigara, Japan

[21] Appl. No.: 702,321

[22] Filed: Jul. 2, 1976

[30] Foreign Application Priority Data

Jul. 4, 1975 Japan .................................. 50-82443

[51] Int. Cl.$^2$ .......................... C09H 7/00; G03C 1/30
[52] U.S. Cl. ...................................... 260/117; 96/111; 260/157; 260/159
[58] Field of Search .......................................... 260/117; 96/111 (U.S. only)

[56] References Cited

U.S. PATENT DOCUMENTS

| | | | |
|---|---|---|---|
| 3,455,892 | 7/1969 | Froehlich | 260/117 |
| 4,010,035 | 3/1977 | Fujiwhara et al. | 96/111 X |

OTHER PUBLICATIONS

Peterson et al., Canadian Journal of Chemistry, vol. 51, pp. 2448-2451 (1973).
Organic Synthesis, vol. 48, pp. 44-47 (1968).

Primary Examiner—Walter C. Danison
Attorney, Agent, or Firm—Sughrue, Rothwell, Mion, Zinn and Macpeak

[57] ABSTRACT

Gelatin hardening agents represented by the following formulae (I) or (II):

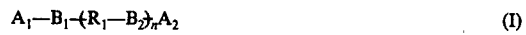

(I)

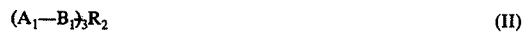

(II)

wherein $A_1$ and $A_2$ each represents an azole group which is linked to $B_1$ or $B_2$ by a nitrogen atom, wherein the azole group is a 5-membered ring having 2 or more nitrogen atoms which has a conjugated system and which may include a condensed ring, $B_1$ and $B_2$ each represents

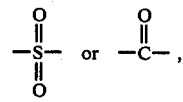

$R_1$ represents a divalent group, $R_2$ represents a trivalent group, and $n$ represents 0 or 1.

6 Claims, No Drawings

GELATIN HARDENING AGENTS

BACKGROUND OF THE INVENTION

1. Field of the Invention

The present invention relates to gelatin hardening agents, particularly, to gelatin hardening agents used for photographic sensitive materials.

2. Description of the Prior Art

Gelatin is used as a binder for many photographic sensitive materials. For example, gelatin is used as a main ingredient for silver halide emulsion layers, emulsion protective layers, filter layers, intermediate layers, antihalation layers, backing layers, subbing layers for a film base or a baryta layer, etc.

Such sensitive materials containing gelatin are processed using various aqueous solutions each having a different pH or at different temperatures. However, layers containing gelatin which do not contain a hardening agent have poor resistance to processing and excessively swell in aqueous solutions whereby they are easily damaged. Particularly, in an aqueous solution of a temperature of 30° C or more, gelatin layers sometimes dissolve and flow in some cases.

It is known that a number of compounds are effective to improve water resistance, heat resistance and scratch resistance of a gelatin layer. These compounds are known hardeners for photographic sensitive materials. For example, organic hardening agents such as aldehyde compounds such as formaldehyde or glutaraldehyde, etc., reactive halogen containing compounds as described in U.S. Pat. No. 3,288,775, compounds having a reactive ethylenically unsaturated bond as described in U.S. Pat. No. 3,635,718, aziridine compounds as described in U.S. Pat. No. 3,017,280, epoxy compounds as described in U.S. Pat. No. 3,091,537, halogenocarboxyaldehydes such as mucochloric acid, dioxanes such as dihydroxydioxane or dichlorodioxane, substituted methyl esters (for example, such as

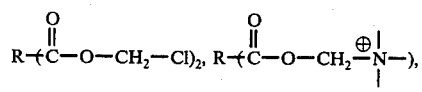

etc.) as described in U.S. Pat. Nos. 3,241,972 and 3,542,558 and Japanese Patent Publication 48,896/72, and inorganic hardening agents such as chromium alum, chromium sulfate, aluminium sulfate, potassium alum, ammonia alum or zirconium sulfate, etc., are well known.

However, these known gelatin hardening agents all have some defect when they are used in photographic sensitive materials; that is, there are those having an insufficient hardening function, those which cause changes of the hardening function by the lapse of time, those which cause "post-hardening" because of a slow hardening reaction with gelatin, those which have a harmful influence upon properties of the photographic sensitive materials (particularly, which increase fog, deteriorate sensitivity and change gradation, etc.), those which lose their hardening function due to the presence of other photographic additives or decrease effects of other photographic additives (for example, color couplers for color sensitive materials, etc.), those which are hard to produce in large quantities because synthesis is difficult, and those which have poor preservability beacuse of inherent instability.

Many hardening agents are unstable and have poor preservability because they are, in general, active compounds, and are unsuitable for mass production of the photographic sensitive materials having stabilized properties. Hardening agents having good preservability hitherto known, for example, inorganic hardening agents such as chromium alum, are unsuitable for practical use because they have a harmful influence upon the human body.

SUMMARY OF THE INVENTION

One object of the present invention is to provide novel hardening agents for hardening gelatin.

Another object of the present invention is to provide hardening agents having the good stability necessary for mass production of photographic sensitive materials and which have a rapid hardening effect, i.e., which do not substantially cause changes in the hardening function (post-hardening) with the passage of time.

A further object of the present invention is to provide novel, stable hardening agents which have a rapid hardening effect which give excellent water resistance, excellent heat resistance and excellent scratch resistance without having a bad influence upon photographic sensitive materials.

These objects of the present invention have been attained by reacting compounds represented by the following formulae (I) or (II) with gelatin.

 (I)

 (II)

In the formulae, $A_1$ and $A_2$ each represents an azole group which is linked to $B_1$ or $B_2$ by a nitrogen atom, wherein the azole group is a 5-membered ring having 2 or more nitrogen atoms, where the preferred maximum number of nitrogen atoms is 4, such as an imidazole group, which has a conjugated system and can include a condensed ring, e.g., condensed with a benzene ring to give a ring such as a benzotriazole ring, etc. $B_1$ and $B_2$ each represents

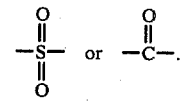

$R_1$ represents a divalent group, $R_2$ represents a trivalent group, and n represents 0 or 1.

DETAILED DESCRIPTION OF PREFERRED EMBODIMENTS

In more preferred embodiments, $A_1$ and $A_2$ each represents an imidazole, 1,2,3-triazole, 1,2,4-triazole or a substituted group thereof in the case that $B_1$ and $B_2$ each represents

or $A_1$ and $A_2$ each represents a pyrazole, benzimidazole or benzotriazole or a substituted group thereof in the case that $B_1$ and $B_2$ each represents

Examples of substituents in the above described azole group include lower alkyl groups having 5 or less carbon atoms such as methyl or ethyl, etc., alkoxy groups having 7 or less carbon atoms such as methoxy or ethoxy, etc., halogens such as chlorine or bromine, etc., a carboxylic acid group, a sulfonic acid group and salts thereof with Na, K or tertiary amines such as triethylamine and trimethylamine, a carbamoyl group and a nitro group, etc.

$R_1$ may represent any divalent group, examples of which include straight, branched or cyclic alkylene groups, most preferably having 1 to 10 carbon atoms, and those wherein a portion of the carbon atoms, typically only 1 carbon atom, is replaced by an oxygen atom or a nitrogen atom, arylene groups having 6 to 10 carbon atoms such as m-phenylene or p-phenylene and those substituted by lower alkyl, most preferably having 1 to 5 carbon atoms, alkoxy, most preferably having 1 to 5 carbon atoms, halogen, carboxyl and sulfoxy groups.

$R_2$ may represent any group if it is a trivalent group, preferably a hydrocarbon having 3 to 15 carbon atoms, including those wherein a portion of the carbon atoms, most preferably only 1 carbon atom, is replaced with an oxygen atom or a nitrogen atom, but $C_6$-$C_{10}$ aryl or $C_3$-$C_{10}$ alkyl groups are particularly preferred.

Some of the hardening agents of the present invention are known compounds and others are novel compounds; however, all of them can be synthesized by known conventional processes in a good yield. See, for example, (i) Canadian Journal of Chemistry, Vol. 51, pp. 2448 to 2451 (1973) or (ii) Organic Synthesis, Vol. 48, pp. 44 to 47 (1968).

Namely, they can be synthesized by a dehydrohalogenation or dehalogenation salt reaction of a corresponding dibasic sulfonic acid halide with a corresponding compound represented by $A_1$ or a metal salt thereof, for example, the sodium or potassium salt, or of a corresponding dibasic or tribasic carboxylic acid halide with a corresponding compound represented by $A_2$ or a metal salt thereof, or an addition reaction of a corresponding di- or trivalent isocyanate with a compound represented by $A_2$. Generally, reactants $A_1$ and $A_2$ are used in the reaction in an amount greater than the molar equivalent thereof. The reaction is conveniently performed in a solvent such as an aprotic solvent using a 1 to 50 weight % solution of the reactants. No catalyst is necessary, but in some cases, if desired, triethylamine can be utilized as a dehydrohalogenating agent in an amount greater than the molar equivalent. Reaction is conveniently conducted at atmospheric pressure at a temperature of from $-70°$ to $100°$ C and is generally always finished in about one day or less. The product is recovered in a conventional manner.

In the following, examples of compounds used in the present invention are described. The compounds of the present invention, however, are not limited thereto.

Compound (1)

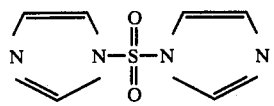

Compound (2)

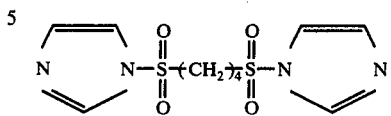

Compound (3)

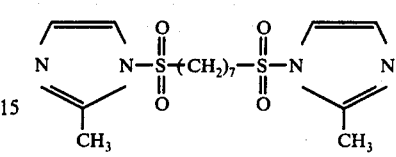

Compound (4)

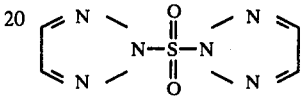

Compound (5)

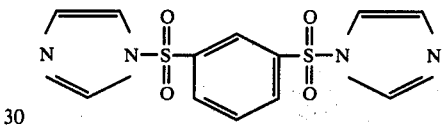

Compound (6)

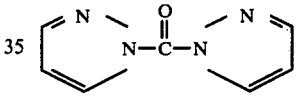

Compound (7)

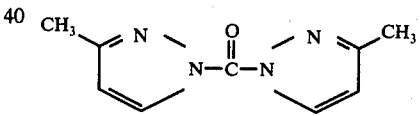

Compound (8)

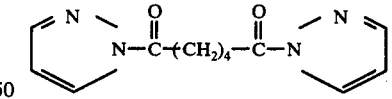

Compound (9)

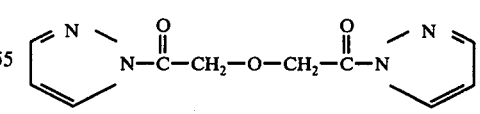

Compound (10)

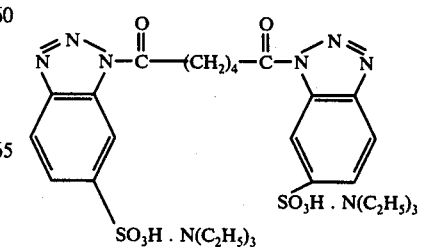

Compound (11)

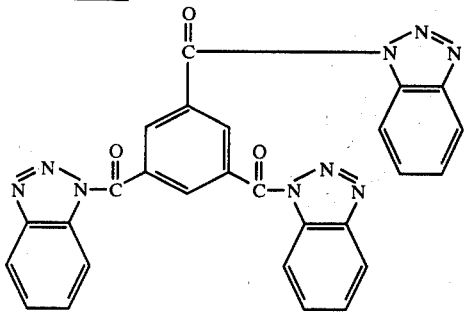

Compound (12)

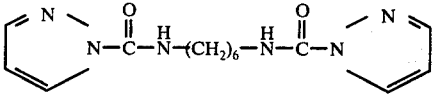

Compound (13)

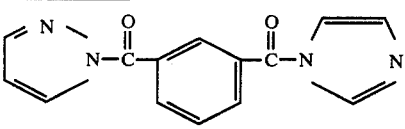

An amount of the hardening agents of the present invention used may be suitably decided in accordance with the purpose. In general, they can be used in a range from about 0.05 to about 10% by weight, the dry weight of the material to be hardened, e.g., based on dry gelatin. A particularly preferred range is 0.2 to 5% by weight. If the hardening agents are used beyond about 10% by weight based on the material to be hardened, e.g., dry gelatin, it is not possible to form a film using an aqueous solution of gelatin, for example, by application or by spraying, etc., because the aqueous solution of, e.g., gelatin, hardens by gelatinization. On the other hand, if the amount is lower than about 0.05% by weight, though formation of the layer is possible using an aqueous solution of, e.g., gelatin, the resultant layer does not harden sufficiently after drying and has an insufficient strength. On the contrary, when the hardening agents of the invention are used in an amount in the above described range, the property of rapidly hardening the gelatin, which is a characteristic of the hardening agents of the present invention, is sufficiently exhibited.

The hardening agents of the present invention may be used alone or they may be used as a mixture of two or more thereof. Further, they may be used together with other known hardening agent(s). Examples of such known hardening agents include aldehyde type compounds such as formaldehyde or glutaraldehyde, ketone compounds such as diacetyl or cyclopentanedione, reactive halogen containing compounds such as bis-(2-chloroethylurea), 2-hydroxy-4,6-dichloro-1,3,5-triazine and compounds as described in U.S. Pat. Nos. 3,288,775 and 2,732,303 and British Pat. Nos. 974,723 and 1,167,207, reactive olefinic compounds such as divinylsulfone, 5-acetyl-1,3-diacryloylhexahydro-1,3,5-triazine and compounds as described in U.S. Pat. Nos. 3,635,718 and 3,232,763 amnd British Pat. No. 994,869, etc., N-methylol compounds such as N-hydroxymethylphthalimide and compounds as described in U.S. Pat. Nos. 2,732,316 and 2,586,168, isocyanates as described in U.S. Pat. No. 3,103,437, aziridine compounds as described in U.S. Pat. Nos. 3,017,280 and 2,983,611, acid derivatives as described in U.S. Pat. Nos. 2,725,294 and 2,725,295, carbodiimide compounds as described in U.S. Pat. 3,100,704, epoxy compounds as described in U.S. Pat. No. 3,091,537, isoxazole compounds as described in U.S. Pat. Nos. 3,321,313 and 3,543,292, halogenocarboxyaldehydes such as mucochloric acid, dioxane derivatives such as dihydroxydioxane or dichlorodioxane, etc., and inorganic hardening agents such as chromium alum or zirconium sulfate, etc. Further, they may be used together with precursor compounds such as alkali metal bisulfite-aldehyde addition products, methylol derivatives of hydantoin or primary aliphatic nitroalcohols, etc., instead of the above described compounds. In the case that the hardening agents of the present invention are used together with other hardening agents, an amount of such other hardening agents can be suitably decided in accordance with the end use and effects desired. Usually the hardening agents of this invention comprise 5 to 95 wt% of all hardening agents present if used with other hardening agents.

In the case that the hardening agents of the present invention are used in photographic sensitive materials, the silver halide emulsions used are produced by mixing a solution of a water soluble silver salt (for example, silver nitrate) with a solution of a water soluble halide (for example, potassium bromide) in a presence of a solution of a water soluble high molecular weight material such as gelatin. As the silver halide, mixed silver halides such as silver bromochloride, silver iodobromide or silver iodobromochloride as well as silver chloride or silver bromide may be used.

The particles of these silver halides may have any form such as a cubic form, octahedral form or a mixed crystal form. It is not necessary to limit the particle size of silver halide particles or the average particle size distribution to any particular range.

The particles of the silver halides can be produced by a single or double jet process or a controlled double jet process. Further, two or more silver halide photographic emulsions separately prepared may be mixed.

The particles of silver halides may have any crystal structure, for example, they may have a homogeneous structure where the particles are homogeneous, a stratum structure where the core and the shell of the particles each have a different state, or may be of the conversion type structure as described in British Pat. No. 635,841 and U.S. Pat. No. 3,622,318. Further, they may be any of the type wherein a latent image is formed mainly on the surface of the particle or the type wherein the latent image is formed in the interior of the particle. These photographic emulsions have been described in The Theory of the Photographic Processes, written by Mees, published by Macmillan Co., and Chimie Photographique, written by Glafkides, published by Paul Montel Co., and can be prepared by known processes such as an ammonia process, a neutral process, an acid process, etc.

After formation of such particles of silver halides, the particles are generally washed with water in order to remove by-produced water soluble salts (for example, potassium nitrate in the case that silver bromide is produced using silver nitrate and potassium bromide) from the system and they are then generally subjected to heat treatment in the presence of a chemical sensitizing agent such as sodium thiosulfate, N,N,N'-trimethylthiourea, a monovalent gold thiocyanate complex salt, a thiosulfate complex salt, stannous chloride or hexamethylenetetramine, etc., to increase their sensitivity without particle growth. Such general processes have been described in the above described books.

The above described silver halide emulsions may be chemically sensitized by conventional methods, if desired. As the chemical sensitizing agents, there are gold compounds such as chloroaurates or gold trichloride, as described in U.S. Pat. Nos. 2,399,083, 2,540,085, 2,597,856 and 1,597,915, etc., salts of noble metals such as platinum, palladium, iridium, rhodhium or ruthenium, as described in U.S. Pat. Nos. 2,448,060, 2,540,086, 2,566,245, 2,566,263 and 2,598,079, sulfur compounds which form silver sulfide by reacting with silver salts, as described in U.S. Pat. Nos. 1,574,944, 2,410,689, 3,189,458 and 3,501,313, and stannous salts, amines and other reducing materials as described in U.S. Pat. Nos. 2,487,850, 2,518,698, 2,521,925, 2,521,926, 2,694,637, 2,983,610 and 3,201,254.

The photographic emulsions to which the hardening agents of the present invention are added can be, if desired, subjected to spectral sensitization or supersensitization using cyanine dyes such as cyanine, merocyanine or carbocyanine dyes, etc., or using a combination of such cyanine dyes and styryl dyes. These dye sensitization techniques are known and are described in, for example, U.S. Pat. Nos. 2,493,748, 2,519,001, 2,977,229, 3,480,434, 3,672,897, 3,703,377, 2,688,545, 2,912,329, 3,297,060, 3,615,635 and 3,628,964, British Pat. Nos. 1,195,302, 1,242,588 and 1,293,862, Japanese Pat. Publications 4,936/68, 14,030/69 and 10,773/68, U.S. Pat. Nos. 3,511,664, 3,522,052, 3,527,641, 3,615,613, 3,615,632, 3,617,295, 3,635,721 and 3,694,217, and British Pat. Nos. 1,137,580 and 1,216,203, etc. The selection of dyes used can be suitably decided according to a wavelength range to be sensitized, sensitivity and the use of the sensitive material.

Various compounds may be added to the above described photographic emulsions in order to prevent a deterioration of the sensitivity or occurrence of fog at production, during preservation or during processing of the sensitive material. As such compounds, many compounds are known, such as 4-hydroxy-6-methyl-1,3,3a,7-tetrazaindene, 3-methylbenzothiazole and 1-phenyl-5-mercaptotetrazole as well as many heterocyclic compounds, mercury containing compounds, mercapto compounds and metal salts, etc. Examples of these compounds are described in The Theory of the Photographic Process, 3rd Edition (1966), written by C. E. K. Mees, pp. 344 to 349 and the following patents: U.S. Pat. Nos. 1,758,576, 2,110,178, 2,131,038, 2,173,628, 2,697,040, 2,304,962, 2,324,123, 2,394,198, 2,444,605 to 2,444,608, 2,566,245, 2,694,716, 2,697,099, 2,708,162, 2,728,663 to 2,728,665, 2,476,536, 2,824,001, 2,843,491, 2,886,437, 3,052,544, 3,137,577, 3,220,839, 3,226,231, 3,236,652, 3,251,691, 3,252,799, 3,287,135, 3,326,681, 3,420,668 and 3,622,339 and British Pat. Nos. 893,428, 403,789, 1,173,609 and 1,200,188.

The term "gelatin" used in this specification includes not only gelatin but also gelatin derivatives wherein amino groups, imino groups, hydroxy groups or carboxyl groups included in the molecule are modified by chemicals having a group which is reactive with these groups or a graft gelatin wherein molecular chains of another high molecular weight material is linked thereto.

As chemicals for producing the above described derivatives, there are isocyanates, acid chlorides and acid anhydrides as described in U.S. Pat. No. 2,614,928, acid anhydrides as described in U.S. Pat. No. 3,118,766, bromoacetic acids as described in Japanese Patent Publication 5,514/64, phenylglycidyl ethers as described in Japanese Patent Publication 26,845/67, vinylsulfone compounds as described in U.S. Pat. No. 3,132,945, N-allylvinylsulfonamides as described in British Patent Publication 861,414, maleinimide compounds as described in U.S. Pat No. 3,186,846, acrylonitriles as described in U.S. Pat. No. 2,594,293, polyalkyleneoxides as described in U.S. Pat. No. 3,312,553, epoxy compounds as described in Japanese Patent Publication 26,845/67, acid esters as described in U.S. Pat. No. 2,763,639 and alkanesultones as described in British Pat. No. 1,033,189.

Further, useful branched high molecular weight materials for grafting to gelatin are described in U.S. Pat. Nos. 2,763,625, 2,831,767 and 2,956,884, Polymer Letters 5, 595 (1967), Phot. Sci. Eng., 9, 148 (1965) and J. Polymer Sci., A-1, 9, 3199 (1971), etc. As such branched high molecular weight materials, many polymers or copolymers of vinyl monomers such as acrylic acid, methacrylic acid or esters, amides or nitriles thereof or styrene, etc., can be used. However, hydrophilic vinyl polymers having some degree of compatibility with gelatin such as homopolymers or copolymers of acrylic acid, acrylamide, methacrylamide, hydroxyalkyl acrylates or hydroxyalkyl methacrylates, etc., are particularly preferred.

According to the present invention, the gelatin can be used, if desired, together with other hydrophilic high molecular weight materials, for example, colloidal albumin, casein, cellulose derivatives such as carboxymethyl cellulose or hydroxyethyl cellulose, agar-agar, sodium alginate, sugar derivatives such as starch derivatives, synthetic hydrophilic colloids such as polyvinyl alcohol, poly-N-vinylpyrrolidone, polyacrylic acid, polyacrylamide or derivatives thereof, or partially hydrolyzed products thereof. If desired, gelatin can be completely replaced by the gelatin derivatives, and part of gelatin can be replaced by the hydrophilic high molecular weight materials recited, e.g., up to about 50 wt% of the gelatin can be so replaced.

In the case that the hardening agents of the present invention are used in photographic sensitive materials, synthetic polymer compounds, for example, a polymer latex of a water dispersible vinyl compound, particularly compounds for increasing the dimensional stability of the photographic material, may be added alone or as a mixture (of different polymers) to photographic emulsion layers or other layers or may be added together with a hydrophilic water permeable colloid. As such polymers, there are many compounds, which have been described in, for example, U.S. Pat. Nos. 2,376,005, 2,739,137, 2,853,457, 3,062,674, 3,411,911, 3,488,708, 3,525,620, 3,635,715, 3,607,290 and 3,645,740 and British Pat. Nos. 1,186,699 and 1,307,373, etc. In the compounds described in the above patents copolymers and homopolymers of alkyl acrylates, alkyl methacrylates acrylic acid, methacrylic acid, sulfoalkyl acrylates, sulfoalkyl methacrylates, glycidyl acrylates, glycidyl methacrylates, hydroxyalkyl, acrylates, hydroxyalkyl methacrylates, alkoxyalkyl acrylates, alkoxyalkyl methacrylates, styrene, butadiene, vinyl chloride, vinylidene chloride, maleic acid anhydride and itaconic acid anhydride are generally used. If necessary, emulsion polymerization latexes which are prepared in the presence of a hydrophilic colloid high molecular weight material may be used in the case that the vinyl compounds are subjected to emulsion polymerization.

When the gelatin hardening agents of the present invention are used in photographic sensitive materials, they may be used together with matting agents, if desired. As the matting agents, fine particles of water insoluble organic or inorganic compounds having an average particles size of 0.2 to 10 $\mu$ can be used, and, particularly, those having an average particle size of 0.3 to 5 $\mu$ are preferred. Examples of organic compounds suitably used include water dispersible vinyl polymers such as polymethyl acrylate, polymethyl methacrylate, polyacrylonitrile, acrylonitrle-$\alpha$-methylstyrene copolymers polystyrene, styrene-divinylbenzene copolymers, polyvinyl acetate, polyethylene carbonate or polytetrafluoroethylene, etc., cellulose derivatives such as methylcellulose, ethylcellulose, cellulose acetate or cellulose acetate propionate, etc., starch, starch derivatives such as carboxy starch, carboxynitrophenyl starch, or urea-formaldehyde-starch reaction products etc., gelatin hardened by known hardening agents and hardened gelatin obtained by coacervation to form microcapsulated hollow granules, etc. Examples of inorganic compounds suitably used include silicon dioxide, titanium dioxide, magnesium dioxide, aluminium dioxide, barium sulfate, calcium carbonate, silver chloride and silver bromide which have been desensitized by known methods, glass, etc. The above described matting agents may be used, if desired, as a mixture with other materials.

In the case that the gelatin hardening agents of the present invention are used in photographic sensitive materials, they may also be used together with couplers. In this case, the non-diffusible couplers are incorporated in the silver halide emulsion layer. Examples of such couplers include 4-equivalent diketomethylene type yellow couplers and 2-equivalent diketomethylene type yellow couplers, for example, compounds as described in U.S. Pat. Nos. 3,415,652, 2,447,928, 3,311,476 and 3,408,194, compounds as described in U.S. Pat. Nos. 2,875,057, 3,265,506, 3,409,439, 3,551,155 and 3,551,156 and compounds as described in Japanese Pat. Applications (OPI) 26,133/72 and 66,836/73; 4-equivalent or 2-equivalent pyrazolone type magenta couplers and imidazolone type magenta couplers, for example, compounds as described in U.S. Pat. Nos. 2,600,788, 2,983,608, 3,062,653, 3,214,437, 3,253,924, 3,419,391, 3,419,808, 3,476,560 and 3,582,322, Japanese Pat. Publication 20,636/70 and Japanese Patent Application (OPI) 26,133/72; and $\alpha$-naphthol type cyan couplers or phenol type cyan couplers, for example, compounds as described in U.S. Pat. Nos. 2,474,293, 2,698,794, 3,034,892, 3,214,437, 3,253,924, 3,311,476, 3,458,315 and 3,591,383 and Japanese Patent Publicatons 11,304/67 and 32,461/69. In addition, DIR couplers as described in U.S. Pat. Nos. 3,227,554, 3,297,445, 3,253,924, 3,311,476, 3,379,529, 3,516,831, 3,617,291 and 3,705,801 and German Patent Publication (OLS) 2,163,811 can also be used.

To the photographic emulsions of the photographic sensitive material to which the hardening agents of the present invention are applied, surface active agents may be added alone or as a mixture of two or more thereof. Although they are used as application assistants, they can also be used for other purposes such as for emulsifying and dispersing, for improvement of photographic properties, for prevention of electric charging or for prevention of adhesion, etc.

These surface active agents are classified into natural surface active agents such as saponin, nonionic surface active agents such as alkylene oxide type agents, glycerine type agents or glycidol type agents, etc., cationic surface active agents such as higher alkylamines, quaternary ammonium salts, pyridine and other heterocyclic compounds, phosphonium compounds or sulfonium compounds, etc., anionic surface active agents containing acid groups such as a carboxylic acid group, sulfonic acid groups, phosphoric acid groups, sulfuric acid ester groups or phosphoric acid ester groups, etc., and ampholytic surface active agents such as amino acids, aminosulfonic acids or sulfuric or phosphoric acid esters of aminoalcohols, etc.

Examples of useful surface active agents are described in U.S. Pat. Nos. 2,271,623, 2,340,472, 2,288,226, 2,739,891, 3,068,101, 3,158,484, 3,201,253, 3,210,191, 3,294,540, 3,415,649, 3,441,413, 3,442,654, 3,475,174 and 3,545,974, West German Patent Publication (OPI) 1,942,665 and British Patents 1,077,317 and 1,198,450 as well as Kaimenkasseizai no Gosei to sono Oyo, written by Ryohei Oda et al., (Maki Shoten Co., ed. 1964), Surface Active Agents, written by A. W. Perry (Interscience Publication Incorporated, ed. 1958) and Encyclopedia of Surface Active Agents, Volume 2, written by J. P. Sisley (Chemical Publishing Company, ed. 1964), etc.

The hardening agents of the present invention may be applied to any of alkali processed (lime processed) gelatin produced by immersion in an alkali bath prior to gelatin extraction, acid processed gelatin produced by immersion in an acid bath and enzyme processed gelatin as described in Bull. Soc. Sci. Phot. Japan, No. 16, p. 30 (1966). Further, the gelatin hardening agents of the present invention may be applied to gelatin having a low molecular weight produced by partially hydrolyzing the above described gelatin by heating in a water bath or reacting with a proteolytic enzyme.

The photographic emulsions described above are applied to sheet materials which do not undergo substantial dimensional change during processings, such as a hard support such as glass, metal or porcelain, etc., or a plastic support. As typical plastic supports, there are films conventionally used for photographic sensitive materials such as a cellulose nitrate film, a cellulose acetate film, a cellulose acetate butyrate film, a cellulose acetate propionate film, a polystyrene film, a polyethylene terephthalate film or a polycarbonate film, laminates thereof, a thin glass film, baryta coated paper, paper coated or laminated with an $\alpha$-olefin polymer, particularly, a polymer of an $\alpha$-olefin having 2 to 10 carbon atoms such as polyethylene, polypropylene or an ethylene-butene copolymer, etc., and plastic films as described in Japanese Patent Publication 19,068/72, the surface of which was roughened so as to improve the adhesion to other high molecular weight materials and to improve printability.

These supports may be transparent or opaque, and can be selected according to the purpose of the sensitive materials. In the case of the transparent supports, not only colorless transparent supports but also colored transparent supports which are produced by adding dyes or pigments may be used. They have hitherto been used for X-ray films and are described in J. SMPTE 67, 296 (1958).

As opaque supports, there are not only essentially opaque ones such as paper but also those prepared by adding dyes or titanium oxide to transparent films, plastic films the surface of which has been processed by the method described in Japanese Patent Publication 19,068/72, light intercepting paper or plastic films containing carbon black or dyes, etc. In the case that adhesive strength between the support and the photographic emulsion layer is insufficient, usually a subbing layer is provided which has a good adhesion to both of them. Further, the surface of the support may be processed by a preliminary treatment such as a corona discharge, ultraviolet ray exposure or flame treatment, etc., in order to further improve adhesion property.

In the case that the hardening agents of the present invention are used, each layer in the photographic sensitive material may be applied by various application methods such as dip coating, air-knife coating, curtain coating, spray coating or extrusion coating using a hopper as described in U.S. Pat. No. 2,681,294. If desired or necessary, two or more layers may be applied at the same time by the methods as described in U.S. Pat. Nos. 2,761,791, 3,508,947, 2,941,898 and 3,526,528.

Since a hardening reaction rapidly arises by use of the hardening agents of the present invention and there is substantially no post-hardening, the hardness of gelatin layers in the photographic sensitive material produced using the hardening agents of the present invention is fixed and unchangeable from just after production of the sensitive material. Accordingly, if the sensitive material just after preparation is compared with the sensitive material preserved for a certain period of time, there is no difference in apparent sensitivity or color balance between them because there is no difference of the permeation rate of a developer at processing.

The hardening agents of the present invention are very stable and have good preservability; nevertheless they have high hardening ability and cause rapid reaction.

Further, the hardening agents of the present invention neither deteriorate effects of other photographic additives present nor lose their hardening function due to reciprocal reactions with such other photographic additives such as a color coupler for a color sensitive material, etc. Furthermore, they do not have a harmful influence (particularly, to increase fog and deteriorate sensitivity) upon properties of photographic sensitive materials.

The hardening agents of the present invention may be used not only for hardening gelatin by addition to gelatin films but also as hardening agent for processing by adding them to, for example, a photographic processing solution. The hardening agent of this invention will generally comprise 0.1 to 5 wt% of a processing solution if added thereto. The hardener can be added to any bath (photographic processing solution).

Further, materials hardenable by the hardening agents of the present invention are not limited to only gelatin. Hydrophilic high molecular weight materials having primary or secondary amino groups, for example, polyethyleneimine, poly-(ethylene-4-amino-1,2,4-triazole), $\beta$-aminoacrylic acid-ethylene-maleic acid copolymers or vinylamine-acrylic acid copolymers and mixtures of gelatin and other hydrophilic high molecular weight materials can be hardened by means of the hardening agents of the present invention. The molecular weight of such materials is typically on the order of 5,000 to several million.

In the following, examples of the synthesis of compounds used in the present invention and examples of the present invention are illustrated. However, the present invention is not, of course, limited thereto. The synthesis examples were at atmospheric pressure

SYNTHESIS EXAMPLE 1

Synthesis of Compound (1)

30 g of imidazole was dissolved in 500 ml of anhydrous THF (tetrahydrofuran). 15 g of sulfuryl chloride dissolved in 70 ml of benzene was added dropwise to the resultant solution at 0° to 5° C while cooling by ice and stirring. After conclusion of the addition, the mixture was stirred at 5° C for 5 hours and thereafter the temperature was elevated gradually to room temperature. The mixture was then stirred at room temperature for a further 3 hours. It was then filtered and the filtrate condensed and dried to a solid state, whereby light yellow crystals were obtained The crystals were recrystallized from ethanol. Thus, 14 g of white crystal having a 141° C melting point was obtained.

Elementary Analysis Calculated (%): C 36.73 H 3.06 N 28.54 Measured (%): C 36.44 H 2.99 N 28.34

SYNTHESIS EXAMPLE 2

Synthesis of Compound (2)

27.2 g of imidazole was dissolved in 200 ml of anhydrous THF. To the resultant solution, 100 ml of a solution of 25.6 g of tetramethylene disulfonic acid dichloride in 100 ml of anhydrous THF was added dropwise at 0° to 5° C with stirring. After the conclusion of the addition, the mixture was stirred for 5 hours at 0° to 5° C and thereafter the temperature was gradually elevated to room temperature, at which temperature the system was stirred for a further 3 hours. After conclusion of the reaction, the system was condensed to about 200 ml under reduced pressure. It was then poured into 1 l of cool water and precipitated crystals were separated by filtration. They were then recrystallized to obtain 23 g of white crystals having a 154° C melting point (decomposition).

Elementary Analysis Calculted (%): C 37.74, H, 4.40, N 17.61, Measured (%): C 37.79, H 4.52, N 17.58,

SYNTHESIS EXAMPLE 3

Synthesis of Compound (7)

3.9 g of sodium amide was dispersed in 200 ml of ether. To the resultant dispersion, a solution of 8.2 g of 3-methylpyrazole dissolved in 50 ml of anhydrous ether was added dropwise thereto under a nitrogen stream. The mixture was stirred at 25° C for 16 hours and it was then refluxed for 4 hours. After the solution was cooled to −78° C, 4.95 g of phosgene gas was introduced into the solution. It was then refluxed with heat for 2 to 3 hours. Precipitated crystals were separated by filtration and the filtrate was distilled under a nitrogen stream, whereby 6.2 g of crystals having 68°–69° C melting point was obtained.

Elementary Analysis Calculated (%): C 56.8 H 5.3 N 29.4 Measured (%): C 56.5 H 5.2 N 29.6

SYNTHESIS EXAMPLE 4

Synthesis of Compound (8)

14 g of pyrazole and 22 g of triethylamine were dissolved in 300 ml of anhydrous acetone. To the resultant solution a solution of 18 g of adipic acid chloride in 70 ml of anhydrous benzene was added dropwise with stirring at 0° to 2° C. After stirring at 5° C for 3 hours, the temperature was elevated to room temperature. After stirring for a further 2 hours at room temperature, it was filtered and the resultant filtrate was condensed to obtain crystals. They were reprecipitated from acetone and hexane, whereby 18 g of white crystals having a 96°–97° C melting point was obtained.

Elementary Analysis Calculated (%): C 58.54 H 5.69 N 22.76 Measured (%): C 58.32 H 5.72 N 22.53

EXAMPLE 1

To an aqueous solution containing 100 g of dry gelatin per 1l, hardening agents of the present invention were added as shown in the following Table. Each solution was applied to a polyester (polyethylene terephthalate) base having a subbing layer so as to form a dried film having about a 15 μ thickness to produce samples. After the resultant samples were stored for 20 days in a room at normal conditions, the degree of swelling in water thereof was measured.

The values of the degree of swelling were obtained as follows: after the sample was dipped in water at 20° C for 10 minutes, the increase in the thickness of the film was measured and the increase in thickness was divided by the thickness of the dry gelatin film. A sample calculation follows:

Degree of swelling = $(T/T_O)$
$T$: increased thickness of film, after the sample was dipped in water at 20° C for 10 minutes;
$T_O$: the thickness of the dry gelatin film (initial and not dipped)

TABLE 1

Results of measurement of degree of swelling in Example 1

| Hardening Agent | Amount Added millimol/g . gelatin | Degree of Swelling | Note |
|---|---|---|---|
| None | 0 | 10.25 | Control |
| Compound 1 | 0.1 | 4.35 | The present invention |
| Compound 2 | " | 5.05 | " |
| Compound 4 | " | 5.10 | " |

As can be understood from the results in Table 1, the compounds of the present invention have excellent hardening ability such that they can cross-link gelatin to prevent swelling in an aqueous atmosphere.

EXAMPLE 2

An emulsion prepared by a neutral process containing 120 g of gelatin and 100 g of silver bromide per 1 kg was divided into several portions. After hardening agents were added to each portion as shown in the following table, each emulsion was applied to a triacetyl cellulose base having a subbing layer so as to form a dry film having about a 10 μ thickness to produce sample films. The films were stored at 55% RH at 25° C. On the 1st day, the 3rd day, the 7th day and the 28th day after application, the melting point of each emulsion film was measured. Further, the melting point of the emulsion film of the sample film stored for 2 days under 80% RH at 50° C was measured.

The melting point of the emulsion film was measured as follows: namely, the sample film was immersed in a 2% aqueous solution of $Na_2CO_3$ the temperature of which was elevated from 25° C at a rate of 1° C per minute, and the temperature at which the swollen emulsion layer began to melt was taken as the melting point of the emulsion film.

TABLE 2

Results of measurement of post-hardening in Example 2

| Hardening Agent | Amount Added millimol/ g . gelatin | Melting Point (° C) | | | | Melting Point 50° C, 80% RH, 2 Days (° C) |
|---|---|---|---|---|---|---|
| | | 1st day | 3rd day | 7th day | 28th day | |
| None | 0 | 34 | 34 | 34 | 34 | 34 |
| Mucochloric acid | 0.05 | 57 | 66 | 69 | 74 | 84 |
| Compound 1 | " | 65 | 79 | 80 | 80 | 82 |
| Compound 2 | " | 60 | 68 | 68 | 68 | 68 |
| Compound 8 | " | 57 | 70 | 70 | 70 | 71 |

According to Table 2, it can be understood that mucochloric acid has a sufficient hardening ability but the melting point of the film continues to rise with the passage of time to cause post-hardening. On the contrary, every compound of the present invention has a sufficient hardening ability and the melting point changes less with the passage of time and thus it has a preferred hardening rate.

EXAMPLE 3

1/10 molar solutions of a hardening agent in dimethylformamide were prepared using each of Compound 1 and Compound 9 which are hardening agents of the present invention. Using the solutions just after preparation, sample films containing 0.1 millimol of the hardening agent per gram of dry gelatin were produced in the same manner as described in Example 2. Similarly, sample films were prepared in the same manner as described above except that the solutions prepared were stored at room temperature for 20 days. On the 28th day after application, the melting point of the emulsion layer of each sample film was measured in the same manner as described above.

In the case of either Compound 1 or Compound 9, there was no substantial difference (which could cause trouble in practical use) between the melting point of the sample film prepared just after preparation of the solution of the hardening agent and that of the sample film prepared on the 20th day after preparation of the solution of the hardening agent. Moreover, they exhibited good stability which is a preferred characteristic for the mass production of the photographic sensitive materials.

While the invention has been described in detail and with reference to specific embodiments thereof, it will be apparent to one skilled in the art that various changes and modifications can be made therein without departing from the spirit and scope thereof.

What is claimed is:

1. A method of hardening gelatin or a gelatin derivative which comprises adding thereto 0.05% to 10% by weight based on dry weight of the material to be hardened of a hardening agent represented by the following formulae (I) or (II):

wherein $A_1$ and $A_2$ each represents a azole group which is linked to $B_1$ or $B_2$ by a nitrogen atom, wherein said azole group is a 5-membered ring having 2 or 3 nitrogen atoms and a conjugated system, which may include a fused ring, $B_1$ and $B_2$ each represents

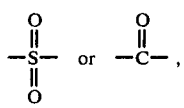

$R_1$ represents a divalent group selected from the group consisting of branched or cyclic alkylene groups wherein a portion of the carbon atoms thereof can be replaced by oxygen or nitrogen atoms and arylene groups having 6 to 10 carbon atoms, unsubstituted or substituted by lower alkyl, alkoxy, halogen, carboxyl or sulfoxy groups, $R_2$ represents a trivalent group selected from the group consisting of hydrocarbon groups having 3 to 15 carbon atoms wherein a portion of the carbon atoms can be replaced by oxygen or nitrogen atoms, and $n$ represents 0 or 1.

2. The method of claim 1 wherein $B_1$ and $B_2$ in formulae (I) and (II) each represents

and $A_1$ and $A_2$ are different from each other and each represents an azole group which is linked to $B_1$ or $B_2$ by a nitrogen atom.

3. The method of claim 1 wherein $B_1$ and $B_2$ in formulae (I) and (II) each represents

and $A_1$ and $A_2$ are different from each other and each represents an imidazole group, a 1,2,3-triazole group, a 1,2,3-triazole group or such a group substituted with an alkyl group having 5 or less carbon atoms, an alkoxy group having 7 or less carbon atoms, a halogen atom, a carboxyl group, a sulfo group or salts thereof, or a tertiary amines, a carbamoyl group or a nitro group.

4. The method of claim 1 wherein $B_1$ and $B_2$ in formulae (I) and (II) each represents

and $A_1$ and $A_2$ are identical and each represents an imidazole group, a 1,2,3-triazole group, a 1,2,4-triazole group or such a group substituted with an alkyl group having 5 or less carbon atoms, an alkoxy group having 7 or less carbon atoms, a halogen atom, a carboxyl group, a sulfo group or a salt of such groups or a tertiary amine, a carbamoyl group or a nitro group.

5. The method of claim 1 wherein $B_1$ and $B_2$ in formulae (I) and (II) each represents

and $A_1$ and $A_2$ are different from each other and each represents a pyrazole group, a benzimidazole group or a benzotriazole group.

6. The method of claim 1 wherein in the definition for $R_1$ the alkylene group has 1 to 10 carbon atoms and only 1 carbon atom thereof can be replaced by an oxygen atom or a nitrogen atom, the alkyl group has 1 to 5 carbon atoms and the alkoxy group has 1 to 5 carbon atoms; and wherein in the definition for $R_2$ the hydrocarbon group is a $C_6$–$C_{10}$ aryl or $C_3$–$C_{10}$ alkyl group and only one of the carbon atoms thereof can be replaced by a nitrogen atom or an oxygen atom.

* * * * *